(12) United States Patent
Zhu et al.

(10) Patent No.: US 11,501,402 B2
(45) Date of Patent: Nov. 15, 2022

(54) DYNAMIC GEOFENCE ZONES FOR RIDE SHARING

(71) Applicant: Beijing DiDi Infinity Technology and Development Co., Ltd., Beijing (CN)

(72) Inventors: Huaiyu Zhu, Newark, CA (US); Kang Yuan, Beijing (CN); Dong Li, Santa Clara, CA (US); Jing Chen, Palo Alto, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 118 days.

(21) Appl. No.: 16/722,332

(22) Filed: Dec. 20, 2019

(65) Prior Publication Data
US 2021/0192664 A1     Jun. 24, 2021

(51) Int. Cl.
*G06Q 50/30* (2012.01)
*G06Q 30/02* (2012.01)
*G06Q 10/02* (2012.01)
*G08G 1/00* (2006.01)

(52) U.S. Cl.
CPC ......... *G06Q 50/30* (2013.01); *G06Q 30/0201* (2013.01); *G06Q 30/0205* (2013.01); *G06Q 10/02* (2013.01); *G08G 1/207* (2013.01)

(58) Field of Classification Search
CPC .............. G06Q 50/30; G06Q 30/0205; G06Q 30/0201; G06Q 10/02; G08G 1/207
USPC ........................................................ 705/13
See application file for complete search history.

(56) References Cited

U.S. PATENT DOCUMENTS

| | | | | |
|---|---|---|---|---|
| 9,602,129 B2* | 3/2017 | Agrawal | ............... | G06F 16/22 |
| 9,924,315 B1* | 3/2018 | Cornwall | ............... | H04W 4/025 |
| 10,147,325 B1* | 12/2018 | Copeland | ............... | H04W 4/21 |
| 10,152,053 B1* | 12/2018 | Smith | ............... | G06Q 10/02 |
| 11,246,005 B2* | 2/2022 | Li | ............... | G08G 1/202 |
| 2008/0094230 A1* | 4/2008 | Mock | ............... | G08B 31/00 340/573.4 |
| 2013/0097163 A1* | 4/2013 | Oikarinen | ............... | G06F 16/29 707/736 |
| 2014/0304115 A1* | 10/2014 | Kilmar | ............... | G06Q 50/16 705/26.61 |

(Continued)

FOREIGN PATENT DOCUMENTS

| | | |
|---|---|---|
| CN | 107240003 A | 10/2017 |
| CN | 109949566 A | 6/2019 |
| WO | 2009/053953 A1 | 4/2009 |

OTHER PUBLICATIONS

Whelan, Phil; "Geohash Intro" <https://bigfastblog.com/geohash-intro> (<http://web.archive.org/web/20181127075807/https://bigfastblog.com/geohash-intro> captured on Nov. 27, 2018 using Wayback Machine) (Year: 2018).*

(Continued)

*Primary Examiner* — George Chen
*Assistant Examiner* — Brian A Tallman
(74) *Attorney, Agent, or Firm* — Sheppard Mullin Richter & Hampton LLP (57) ABSTRACT

Dynamic geofence zones may be deployed and updated for a ride sharing service. At least one set of dynamic geofence zones may be created which are associated with a ride sharing service. At least one time period may be set for the at least one set of dynamic geofence zones. The at least one set of dynamic geofence zones may be deployed. The at least one set of dynamic geofence zones may be updated.

18 Claims, 7 Drawing Sheets

(56) References Cited

U.S. PATENT DOCUMENTS

| | | | | |
|---|---|---|---|---|
| 2016/0187139 A1* | 6/2016 | Agulnik | ............... | G06Q 50/265 |
| | | | | 701/408 |
| 2017/0086051 A1* | 3/2017 | Truong | ................ | G08G 1/0104 |
| 2017/0200321 A1* | 7/2017 | Hummel | ............ | G06Q 30/0611 |
| 2018/0189669 A1* | 7/2018 | Jeon | ........................ | G06N 20/00 |
| 2018/0288568 A1* | 10/2018 | Pao | ....................... | H04W 4/021 |
| 2018/0315148 A1* | 11/2018 | Luo | ........................ | G06Q 50/30 |
| 2019/0236374 A1* | 8/2019 | Nakagawa | ......... | G06K 9/00362 |
| 2020/0318982 A1* | 10/2020 | Shirani-Mehr | .... | G01C 21/3423 |
| 2021/0150420 A1* | 5/2021 | Hurley | ................... | H04W 4/40 |

OTHER PUBLICATIONS

Wikipedia 'Geohash' entry <https://en.wikipedia.org/wiki/Geohash> (<http://web.archive.org/web/20170215044609/https://en.wikipedia.org/wiki/Geohash> captured on Feb. 15, 2017) (Year: 2017).*

Mark, Julian "Lyft rides permanently diverted from busy parts of SF's Valencia Street", Aug. 27, 2018, Mission Local <https://missionlocal.org/2018/08/lyft-rides-permenantly-diverted-from-busy-parts-of-sfs-valencia-street/> (Year: 2018).*

PCT International Search Report and the Written Opinion dated Mar. 24, 2021, issued in related International Application No. PCT/CN2020/137570 (9 pages).

* cited by examiner

DYNAMIC GEOFENCE ZONES FOR RIDE SHARING

TECHNICAL FIELD

The disclosure relates generally to creating and deploying geofence zones for a ride sharing service.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

A claimed solution rooted in computer technology overcomes problems specifically arising in the realm of computer technology. In various implementations, a method may include creating at least one set of dynamic geofence zones associated with a ride sharing service. The method may further include setting at least one time period for the at least one set of dynamic geofence zones. The method may further include deploying the at least one set of dynamic geofence zones, and updating the at least one set of dynamic geofence zones.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include creating at least one set of dynamic geofence zones associated with a ride sharing service. The operations may further include setting at least one time period for the at least one set of dynamic geofence zones. The operations may further include deploying the at least one set of dynamic geofence zones, and updating the at least one set of dynamic geofence zones.

Yet another aspect of the present disclosure is directed to a non-transitory computer-readable storage medium configured with instructions executable by one or more processors to cause the one or more processors to perform operations. The operations may include creating at least one set of dynamic geofence zones associated with a ride sharing service. The operations may further include setting at least one time period for the at least one set of dynamic geofence zones. The operations may further include deploying the at least one set of dynamic geofence zones, and updating the at least one set of dynamic geofence zones.

In some embodiments, updating the at least one set of dynamic geofence zones may include removing at least one dynamic geofence zone from the at least one set of dynamic geofence zones.

In some embodiments, updating the at least one set of dynamic geofence zones may include reducing a size of at least one dynamic geofence zone of the at least one set of dynamic geofence zones by increasing the length of a geohash of the at least one dynamic geofence zone.

In some embodiments, updating the at least one set of dynamic geofence zones may include changing the at least one time period.

In some embodiments, updating the at least one set of dynamic geofence zones may include changing the geohash location of at least one dynamic geofence zone of the at least one set of dynamic geofence zones.

In some embodiments, at least one dynamic geofence zone of the at least one set of dynamic geofence zones may be deployed at an address associated with a rider. The geohash location may be changed to a new address associated with the rider.

In some embodiments, deploying the at least one set of dynamic geofence zones may include obtaining a number of flagged riders in an area. It may be determined that the number of flagged riders is greater than a threshold. At least one dynamic geofence zone of the at least one set of dynamic geofence zones may be deployed to the area.

In some embodiments, a request for a trip may be received from a rider through the ride sharing service. It may be determined that either a pickup location or a destination of the trip is within a dynamic geofence zone of the at least one set of dynamic geofence zones. A time of the trip may be determined to be within the at least one time period, and the request for the trip may be denied.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ride sharing platform by creating and deploying geofence zones. For example, it may not be safe for drivers to pick riders up from certain areas. The ridesharing platform may prevent drivers from being sent to dangerous areas or may give the drivers warning messages. A safety geofence zone may be a geographical area with different safety policies for a trip on the rideshare platform. For example, trip requests may be blocked when riders are in the safety geofence zone. Dynamic geofence zones may be used in areas that are not dangerous all the time, and when not all the riders in an area are aggressors. Dynamic geofence zones may grant or deny ride requests based on location (e.g., pickup, destination), the time of the trip request, and a user profile of the rider requesting the ride (e.g., new/old users, payment method).

Figure 1:
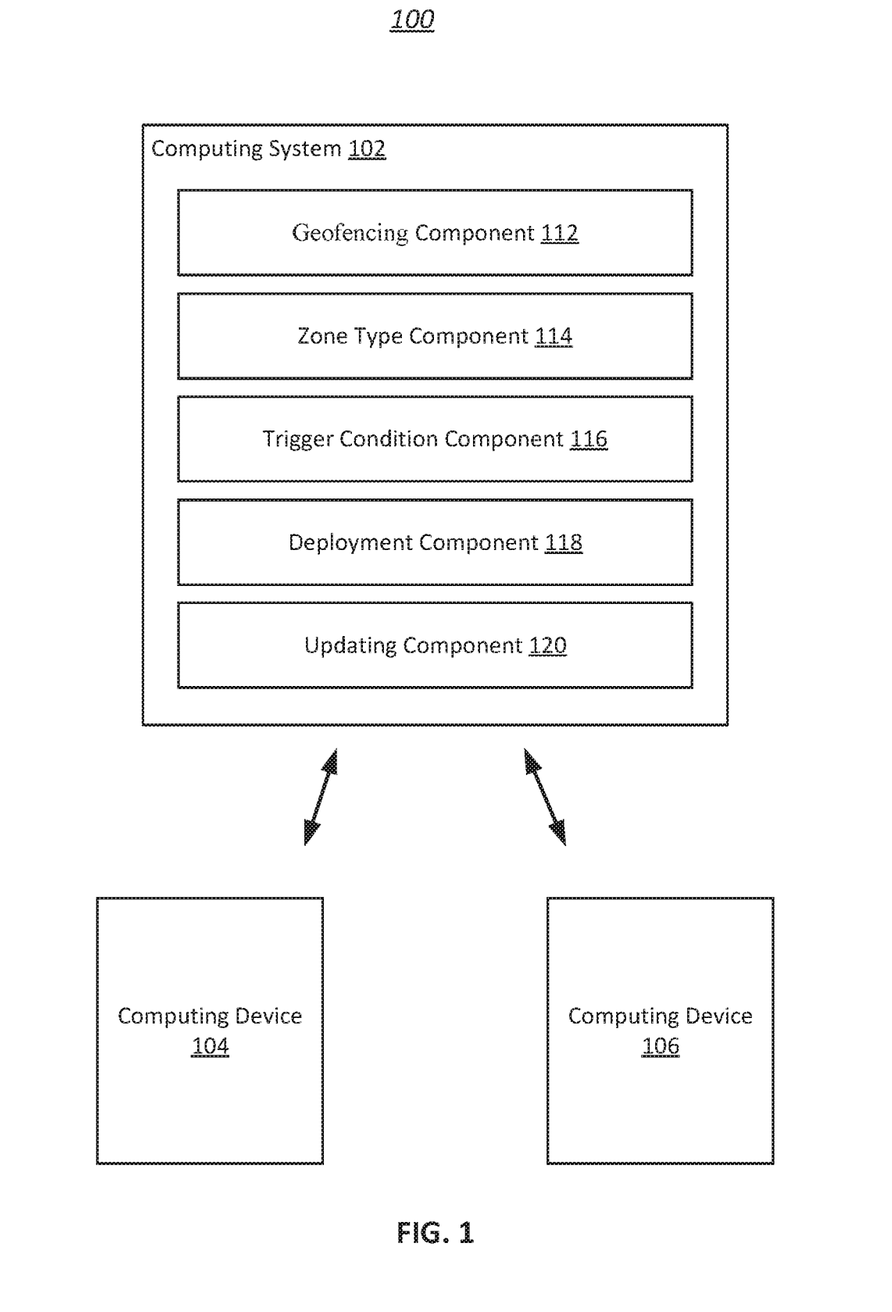
FIG. 1 illustrates an example environment to which techniques for creating and deploying geofence zones may be applied, in accordance with various embodiments.

FIG. 1 illustrates an example environment 100 to which techniques for creating and deploying geofence zones may be applied, in accordance with various embodiments. The example environment 100 may include a computing system 102, a computing device 104, and a computing device 106. It is to be understood that although two computing devices are shown in FIG. 1, any number of computing devices may be included in the environment 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The computing devices 104 and 106 may be implemented on or as various devices such as mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 communicate with each other through computing system 102, and may communicate with each other directly. Communication between devices may occur over the internet, through a local network (e.g., LAN), or through direct communication (e.g., BLUETOOTH™, radio frequency, infrared).

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include a geofencing component 112, a zone type component 114, a trigger condition component 116, a deployment component 118, and an updating component 120. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and memory (e.g., permanent memory, temporary memory). The processor(s) may be configured to perform various operations by interpreting machine-readable instructions stored in the memory. The computing system 102 may include other computing resources.

In some implementations, computing system 102 may comprise a single self-contained hardware device configured to be communicatively coupled or physically attached to a component of a computer system. In some implementations, computing system 102 may include an application specific integrated circuit (ASIC) or a field-programmable gate array (FPGA) configured to perform transaction verification operations associated with one or more decentralized applications. The computing system 102 above may be installed with appropriate software (e.g., platform program, etc.) and/or hardware (e.g., wires, wireless connections, etc.) to access other devices of the environment 100.

The geofencing component 112 may be configured to create at least one set of safety geofence zones associated with a ride sharing service. The at least one set of safety geofence zones may include any number of sets of safety geofence zones (e.g., four sets of safety geofence zones). Each set of safety geofence zones may include any number of safety geofence zones (e.g., one safety geofence zone, ten safety geofence zones). Sets of safety geofence zones may include safety geofence zones which all have common characteristics (e.g., zone type). Safety geofence zones may be created based on multiple sources. For example, local drivers and residents may be surveyed to identify dangerous areas. In another example, public data (e.g., crime records) may be obtained. In another example, safety geofence zones may be created based on incident reports received through the ride sharing service. A ride sharing service may include a platform which connects riders with drivers to that the riders may travel from an origin to a destination. In some embodiments, safety geofence zones may be static. For example, static geofence zones may be active at all times and may be permanently fixed to a geographical location. In some embodiments, a size and a location of each safety geofence zone in the at least one set of safety geofence zones may be based on a geohash code. Geohash codes may correspond to geographical locations. Geohash codes may correspond to geohash squares including longitudinal and latitudinal components. The length of the geohash codes may be variable. A longer geohash code may result in a smaller more precise location (e.g., 8 character geohash). A short geohash code may use less data at the cost of being less precise (e.g., 6 character geohash).

The geofencing component 112 may be configured to create at least one set of dynamic geofence zones associated with a ride sharing service. Dynamic geofence zones may only be active for set periods of times and may be relocated to different areas. In some embodiments, dynamic geofence zones may be smaller than static geofence zones. In some embodiments, the size of dynamic geofence zones may be adjustable. For example, the size of a dynamic geofence zone may be reduced by increasing the size of a corresponding code from six characters to eight characters.

The zone type component 114 may be configured to set a zone type for each set of safety geofence zones in the at least one set of safety geofence zones. In some embodiments, each zone type may be one of a monitoring zone, a warning zone, a non-cash zone, or a blocking zone. Monitoring zones may be upgraded to warning zones if a safety incident occurs in the geographical area. Examples of safety incidents may include robberies and assaults. A warning message may be sent to the driver if a requested trip starts or ends in a warning zone. The driver may be given the option of picking up a passenger in the zone or canceling the trip. The driver may cancel the trip with no penalty. Electronic payment (e.g., credit card, PayPal) may be required for trips starting or ending in non-cash zones. All requested trips with a start or end point in a blocking zone may be blocked. Additional zone types may be used. In some embodiments, the zone type may be different for different riders. In some embodiments, zone types may apply to only a pickup location, only a destination, or both a pickup and a destination for a trip on a ride sharing service.

The zone type component 116 may further be configured to set at least one time period for the at least one set of dynamic geofence zones. For example, a dynamic geofence zone may restrict rides at night and be inactive during the day. In another example, dynamic geofence zones may include spatial-temporal cubes with a geohash represented area and a fixed time window. The time window may have a granularity of one hour. The hours may be represented based on a 24 hour clock. For example, 2 pm may be represented by the number 14. The geohash size may be adjustable to a larger or smaller size depending on the model recall accuracy. For example, a cube may be represented as: {"hash_code":"7jsw5u", "hour":[23, 0, 1, 2]}. The cube may represent an area of "7jsw5u" in the [11:00 pm, 3:00 am] time window. The time period "23, 0, 1, 2" may represent the hours 11 pm, midnight, 1 am, and 2 am respectively. In some embodiments, the spatial-temporal cubes may be different for different riders. In some embodiments, spatial-temporal cubes may apply to only a pickup, only a destination, or both a pickup and a destination for a trip on a ride sharing service.

The trigger condition component 116 may be configured to set at least one trigger condition for the at least one set of safety geofence zones. In some embodiments, each set of safety geofence zones may have multiple trigger conditions. Each set of safety geofence zones may have different trigger conditions. In some embodiments, individual safety geofence zones may have different trigger conditions. The at least one trigger condition may be based on zone types. The at least one trigger condition may be set based on the character of the country or city in which the at least one set of safety geofence zones is located. Examples of trigger conditions may include time ranges, payment methods, and user profiles (e.g., first time riders). In some embodiments, the at least one trigger condition may be different for different riders. For example, trigger conditions may indicate whether a geofence zone is active for a rider requesting a ride.

In some embodiments, a request for a trip may be received from a rider through the ride sharing service. It may be determined if at least one trigger condition is satisfied. In some embodiments, the at least one trigger condition may include at least one of a pickup location or destination of a requested trip being located in the at least one set of safety geofence zones. A remedial action may be performed in response to determining the at least one trigger condition is satisfied. The trip may be scheduled in response to determining the at least one trigger condition not satisfied. In some embodiments, it may be determined that either a pickup location or a destination of a trip is within a dynamic geofence zone of the at least one set of dynamic geofence zones. In some embodiments, the at least one trigger condition may include receiving a ride request within at least one time period. A time of the trip may be determined to be within the at least one time period, and the request for the trip may be denied. For example, all requests from a geofence zone may be blocked at night, and allowed during the day.

In some embodiments, when the zone type is a monitoring zone, the at least one trigger condition may include a safety incident. The zone type may be upgraded to a warning zone in response to the safety incident. For example, the zone type may be upgraded to warning zone in response to a crime (e.g., robbery) happening in a geofence zone. In some embodiments, the zone type may be upgraded in response to the occurrence of a threshold number of safety incidents. In some embodiments, when the zone type is a warning zone, the remedial action may include sending a warning message to a driver. The warning message may allow the driver to cancel the trip without penalty. In some embodiments, when the zone type is a blocking zone, the remedial action may include denying the trip request. For example, all requests from a blocking type geofence zone may be blocked for all users regardless of user profile.

In some embodiments, when the zone type is a non-cash zone, the at least one trigger condition may include cash payment, and the remedial action may include requesting electronic payment. In some embodiments, the remedial action may include blocking the request and requiring the rider to make a new request either from a different location or with a different payment method. In some embodiments, the at least one trigger condition may include the rider being a new rider. New riders may be determined based on a number of trips, account age, or payments received.

In some embodiments, multiple trigger condition may be used in combination. For example, a zone type may be a non-cash zone for new riders, and a monitoring zone for other riders. As a result, new riders may not be able to request trips using cash payments in the geofence zone. However, a first time rider paying with credit card will be able to request a trip. In another example, a rider may be able to walk outside of the non-cash zone in order to request a trip using a cash payment.

In some embodiments, a trip may be identified as a high-risk trip based on whether trigger conditions for a dynamic geofence zone, a payment method, and a rider status are all triggered. The first trigger condition for the dynamic geofence zone may include whether either a pickup location and a trip request time are in a black-listed pickup cube, or a destination location and a trip request time are in a black-listed destination cube. The second trigger condition for the payment method may include a cash only account. The third trigger condition for the rider status may include whether the rider has not finished a threshold number (e.g., 5) trips before this request. If all three trigger conditions are triggered, the trip may be considered a high-risk trip. Some actions may be taken for high-risk trip requests. For example, the request may be directly blocked, or the user may be requested to perform certain identity validation (e.g., provide credit card information).

The deployment component 118 may be configured to deploy the at least one set of safety geofence zones and the at least one set of dynamic geofence zones. Deploying geofence zones may include selecting the number of geofence zones in each set of geofence zones and the size of each geofence zone. The number and size of geofence zones may be based on the geographical location. For example, initially, as many blocking and non-cash zones as possible may be deployed. The number and size of geofence zones may be reduced over time (e.g. after 3 months) if the area is determined to be safe. Zone may be downgraded over time (e.g., non-cash to warning zone, blocking to warning zone).

The number and size of geofence zones may be changed based on data analysis. For example, geofence zones may be based on studies, driver surveys, and criminal activity.

In some embodiments, at least one dynamic geofence zone of the at least one set of dynamic geofence zones may be deployed at an address associated with a rider. The geohash location may be changed to a new address associated with the rider. For example, if it is determined that a crime was committed by a resident of a home, the other residents may be blocked from requesting trips. Dynamic geofence zones may be centered around addresses (e.g., home, business, bar). In some embodiments, deploying the at least one set of dynamic geofence zones may include obtaining a number of flagged riders in an area. It may be determined that the number of flagged riders is greater than a threshold. At least one dynamic geofence zone of the at least one set of dynamic geofence zones may be deployed to the area. For example, if the threshold is fifty percent, and five out of ten residents of an area have committed crimes, the area may be blocked. In some embodiments, dynamic geofence zones may be deployed based on machine learning. For example, a model may be trained using data collected from an area. The model may then be used to predict dangerous areas.

The updating component 120 may be configured to update the at least one set of dynamic geofence zones. In some embodiments, updating the at least one set of dynamic geofence zones may include removing at least one dynamic geofence zone from the at least one set of dynamic geofence zones. In some embodiments, updating the at least one set of dynamic geofence zones may include reducing a size of at least one dynamic geofence zone of the at least one set of dynamic geofence zones by increasing the length of a geohash of the at least one dynamic geofence zone. For example, the geohash may be increased from six characters long to eight characters long. In some embodiments, updating the at least one set of dynamic geofence zones may include changing the at least one time period. For example, the length of a time period may be changed, or a time period may be shifted to another time of day.

In some embodiments, updating the at least one set of dynamic geofence zones may include changing the geohash location of at least one dynamic geofence zone of the at least one set of dynamic geofence zones. For example, a dynamic geofence zone may be moved based on data analysis or machine learning. The number of safety incidents in several areas may be monitored. A dynamic geofence zone may be moved to an area with a high number of safety incidents, or an area that is predicted to have a high number of safety incidents in the future.

A dynamic geofence zone may be moved to another location after a period of time (e.g., daily, monthly) with a reduced number of incidents in the geofence zone. Additional dynamic geofence zone may be created after the period of time. A dynamic geofence zone may be moved to follow a criminal as they move (e.g., change houses). For example, the geofence zone may follow a cell phone (e.g., phone number, ride sharing application). In another embodiment, a threshold number of users with criminal records required to block an area may be updated. The threshold may be adjusted to balance false positive (e.g., blocking good riders) and the number incidents.

In some embodiments, the updating component 120 may be configured to convert at least one static safety geofence into a dynamic geofence zone. The conversion may be based upon the collection of a threshold amount of data associated with the geofence zone. For example, a static safety geofence zone may initially be deployed. Rider behavior data and crime data may be collected. Once a threshold amount of data is collected, dynamic geofence zones may be created within a static safety geofence zone. For example, high risk areas within the static safety geofence zone and high risk time periods may be used to create spatial-temporal cubes. As a result, more rides may be allowed with a low increase in risk.

Figure 2:
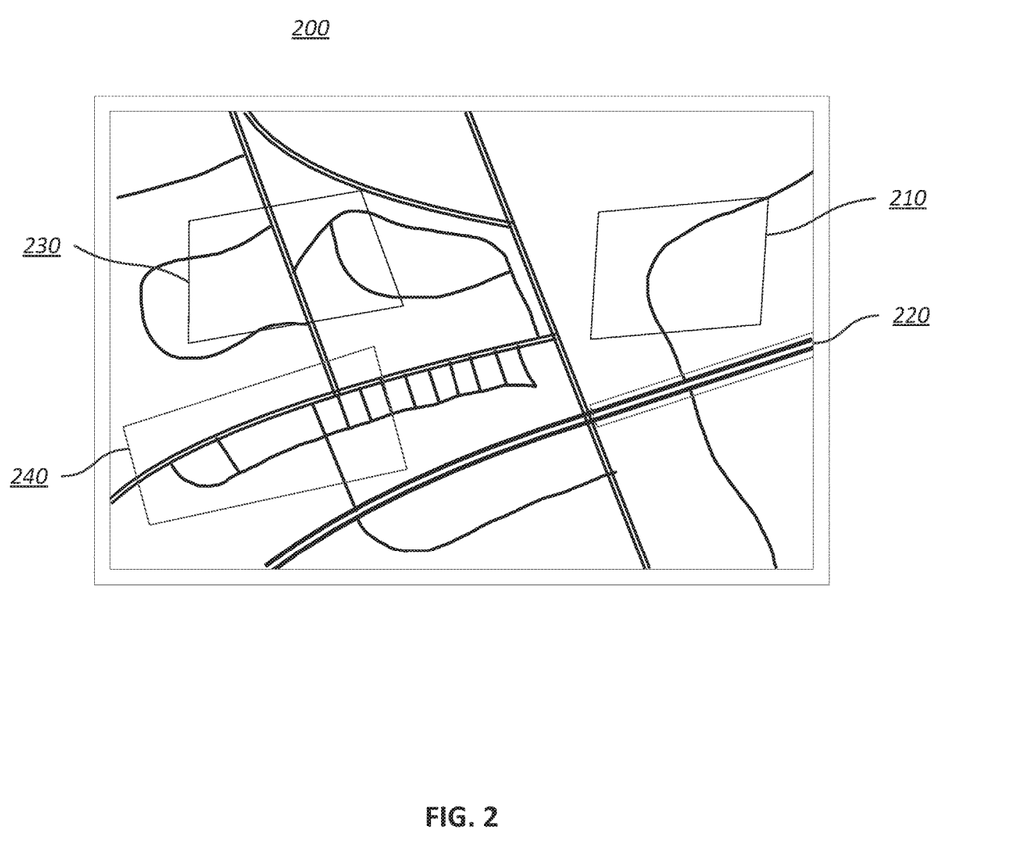
FIG. 2 illustrates an exemplary map of geofence zones, in accordance with various embodiments.

FIG. 2 illustrates an exemplary map 200 of geofence zones, in accordance with various embodiments. Geofence zones 210, 220, 230, and 240 may each have zone types. Any of geofence zones 210, 220, 230, and 240 may have the same zone type, or the zone type may be different for each of geofence zones 210, 220, 230, and 240. Trip requests with origins or destinations within geofence zones 210, 220, 230, and 240 may trigger remedial actions based on the zone types. For example, geofence zone 210 may be a blocking zone. Any request for a trip within geofence zone 210 may be blocked.

Figure 3:
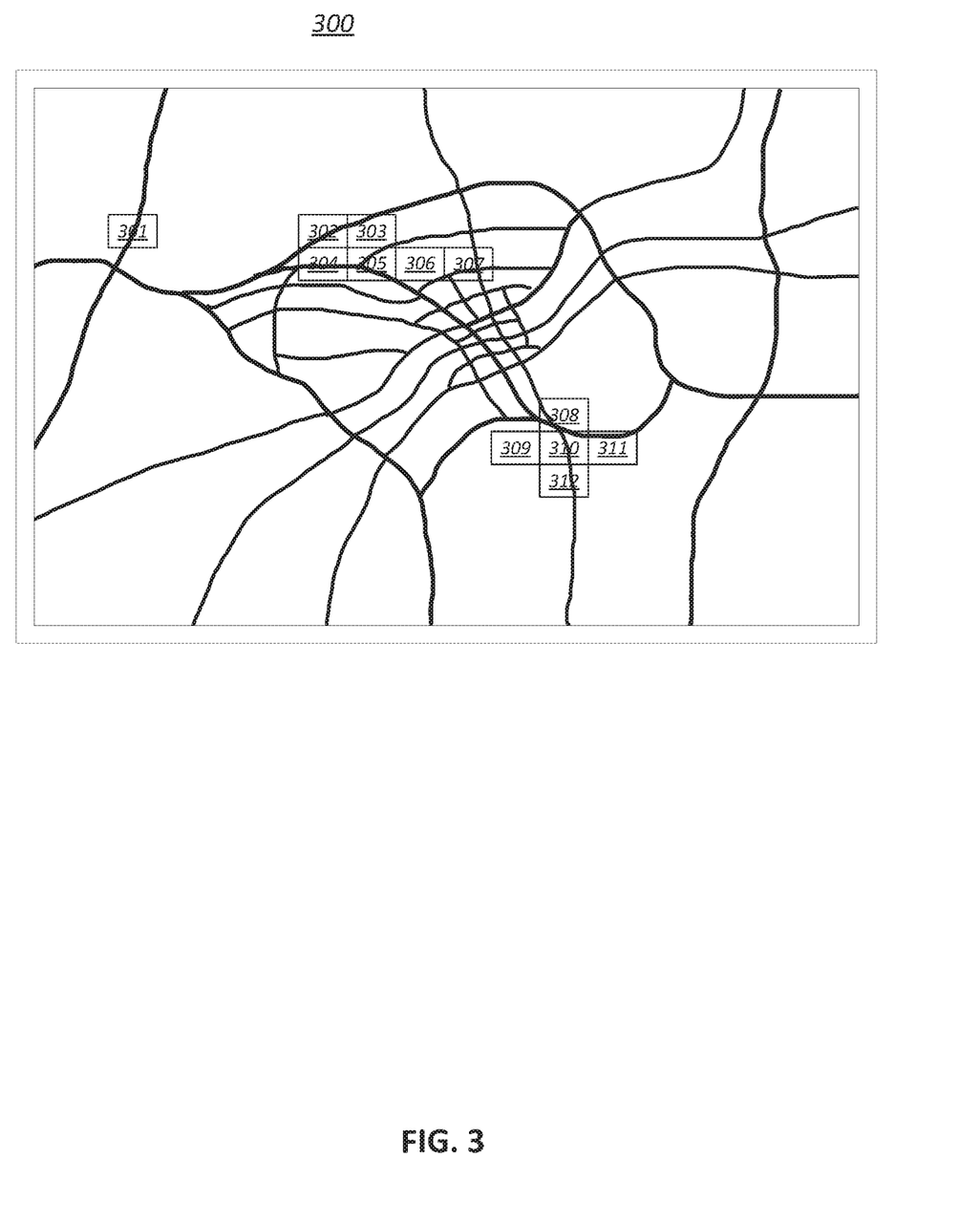
FIG. 3 illustrates an exemplary map of geofence zones, in accordance with various embodiments.

FIG. 3 illustrates an exemplary map 300 of geofence zones, in accordance with various embodiments. Geofence zones 301-312 may each correspond with a geohash code at a certain level of precision. Geofence zones 301-312 may be grouped into sets based on zone types and trigger conditions. Geofence zones 301-312 may be dynamic geofence zones. For example, geofence zone 301 may be located at the address of a criminal. Geofence zone 301 may move to follow the criminal. In another example, geofence zones 302-305 may be blocking zones with a time period from 10 pm to 4 am. All requests from within geofence zones 302-305 may be block between 10 pm and 4 am, and allowed at all other times.

Figure 4:
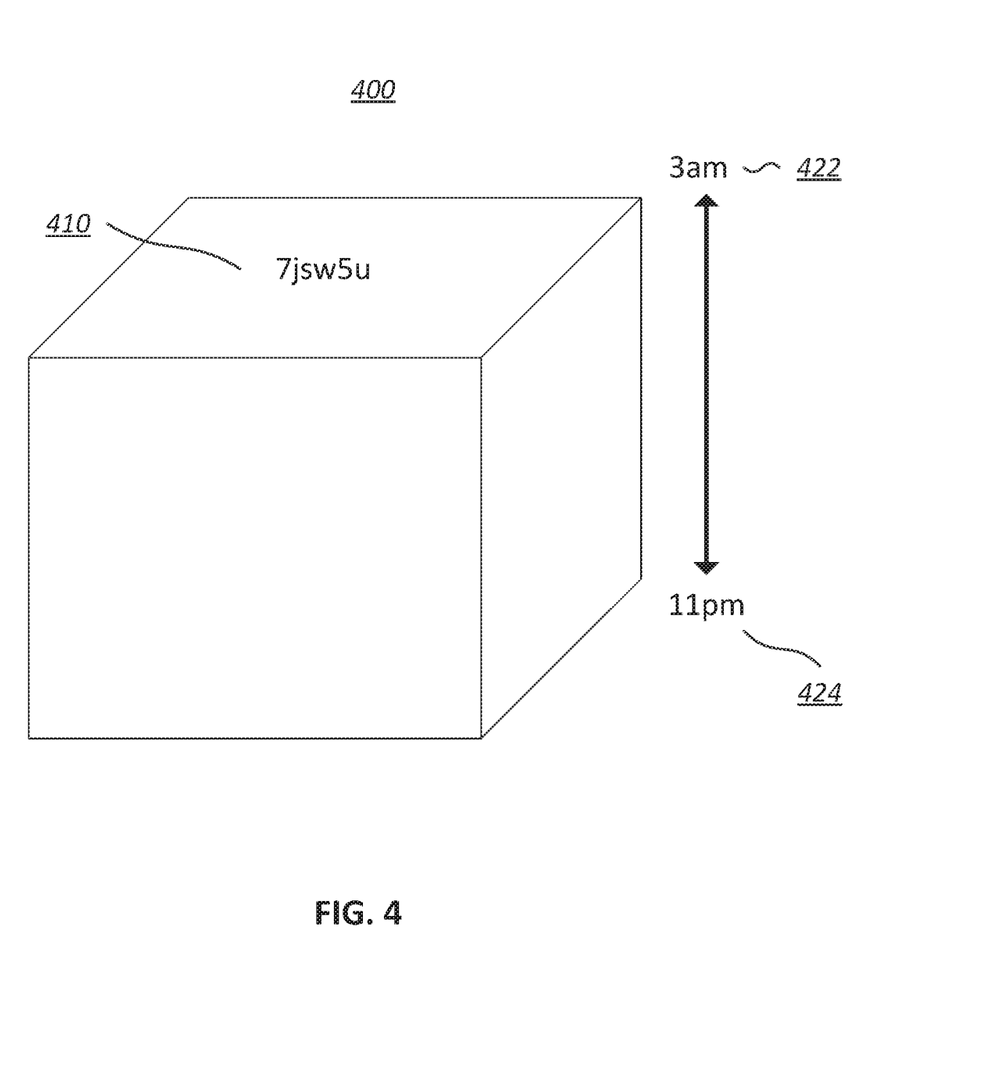
FIG. 4 illustrates an spatial-temporal cube, in accordance with various embodiments.

FIG. 4 illustrates an spatial-temporal cube 400, in accordance with various embodiments. Spatial-temporal cube 400 may have a geohash code 410 of "7jsw5u". The geohash code may correspond with a geographical location. Spatial-temporal cube 400 may have a time period from 11 pm to 3 am. Spatial-temporal cube 400 may correspond with a dynamic geofence zone. The dynamic geofence zone may be active from 11 pm to 3 pm, and inactive at all other times. For example, requests for rides within the geographical location between 11 pm and 3 pm may be blocked.

Figure 5:
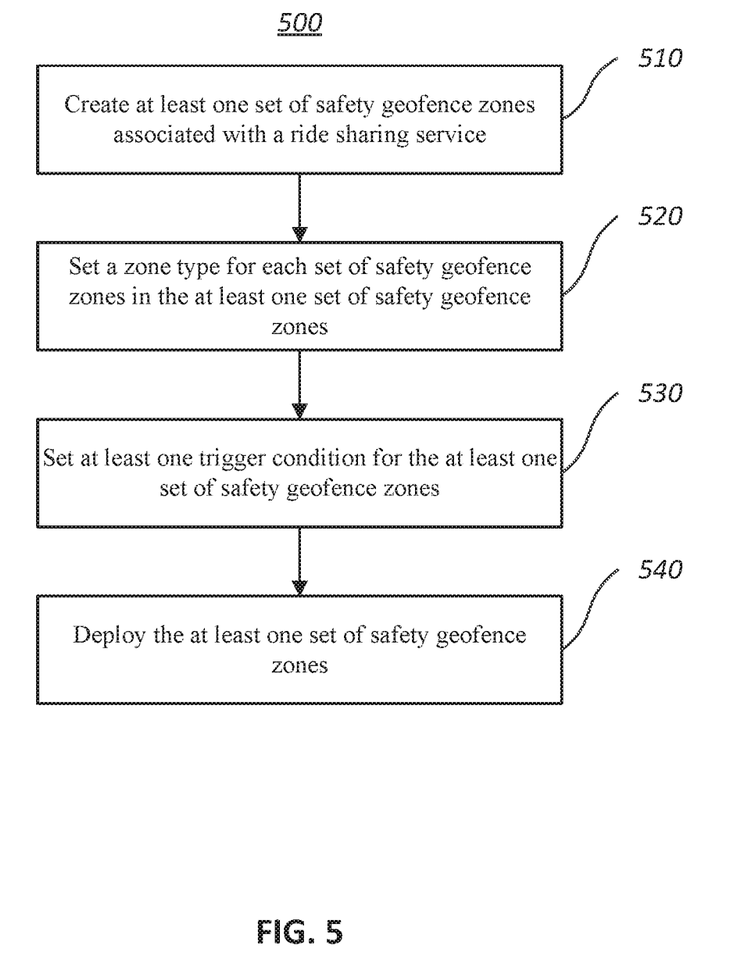
FIG. 5 illustrates a flowchart of an example method, according to various embodiments of the present disclosure.

FIG. 5 illustrates a flowchart of an example method 500, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 510, at least one set of safety geofence zones may be created which are associated with a ride sharing service. At block 520, a zone type may be set for each set of safety geofence zones in the at least one set of safety geofence zones. At block 530, at least one trigger condition may be set for the at least one set of safety geofence zones. At block 540, the at least one set of safety geofence zones may be deployed.

Figure 6:
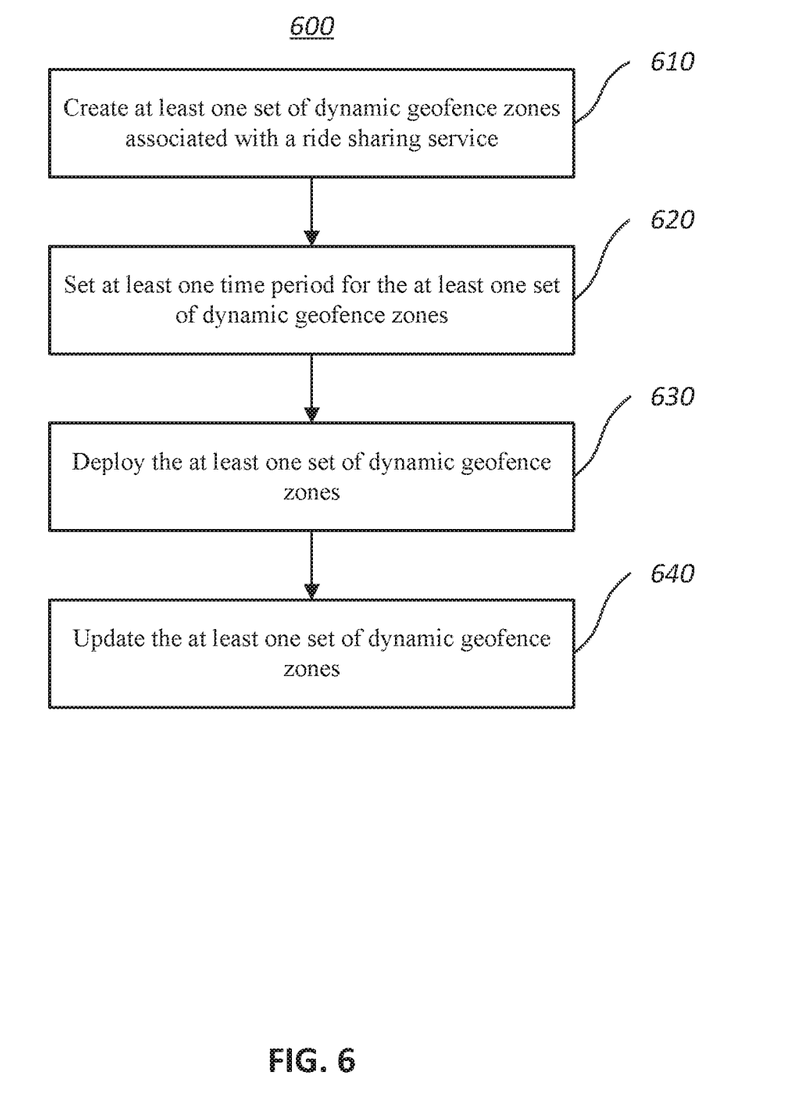
FIG. 6 illustrates a flowchart of an example method, according to various embodiments of the present disclosure.

FIG. 6 illustrates a flowchart of an example method 600, according to various embodiments of the present disclosure. The method 600 may be implemented in various environments including, for example, the environment 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, at least one set of dynamic geofence zones may be created which are associated with a ride sharing service. At block 620, at least one time period may be set for the at least one set of dynamic geofence zones. At block 630, the at least one set of dynamic geofence zones may be deployed. At block 640, the at least one set of dynamic geofence zones may be updated.

Figure 7:
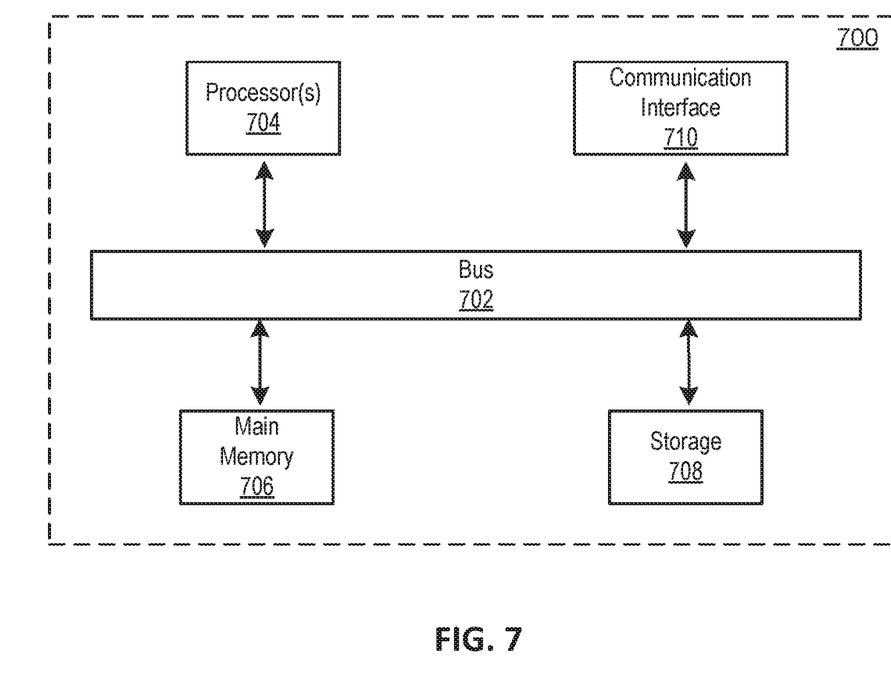
FIG. 7 is a block diagram that illustrates a computer system upon which any of the embodiments described herein may be implemented.

FIG. 7 is a block diagram that illustrates a computer system 700 upon which any of the embodiments described herein may be implemented. For example, the computer system 700 may be any one of the computing system 102 and the computing devices 104 and 106. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein.

For example, the computing system 700 may be used to implement computing system 102, computing device 104, and computing device 106 shown in FIG. 1. In another example, the computing system 700 may be used to implement the one or more components of the computing system 102 shown in FIG. 1. As another example, the process/method shown in FIG. 5, FIG. 6, and described in connection with this figure may be implemented by computer program instructions stored in main memory 706. When these instructions are executed by processor(s) 704, they may perform the steps as shown in FIG. 5 and FIG. 6, and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied in a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
creating, by one or more servers, a static geofence fixed to a geographic location;
in response to collecting rider behavior data and safety incident data over a first threshold, converting, by the one or more servers based on the collected data, the static geofence to at least one set of dynamic geofence zones, the at least one set of dynamic geofence zones corresponding to a plurality of spatial-temporal cubes, wherein each cube represents a dynamic geofence zone, a spatial dimension of the cube comprises a geohash code corresponding to an adjustable area within the geographic location, and a temporal dimension of the cube comprises at least one time period, and the at least one set of dynamic geofence zones are based at least on residence addresses of flagged riders;

deploying, by the one or more servers, the at least one set of dynamic geofence zones for responding to a trip request, wherein the responding to the trip request comprises:

respectively based on a rider corresponding to the trip request, selecting a number of one or more of the at least one set of dynamic geofence zones and a size of each of the one or more of the at least one set of dynamic geofence zones;

based on the collected rider behavior data and safety incident data, training, by the one or more servers, a machine learning model to predict one or more areas to have a number of safety incidents in the future over a second threshold;

updating, by the one or more servers, the plurality of cubes corresponding to the at least one set of dynamic geofence zones, wherein the updating comprises:

moving, based on the trained machine learning model and residence address change of one or more of the flagged riders, one dynamic geofence zone from an area to a different area predicted to have a number of safety incidents in the future over the second threshold by changing a geohash location in the cube corresponding to the one dynamic geofence zone, and adjusting the cube by (i) adjusting, based on a model recall accuracy of the one dynamic geofence zone, a number of characters of the geohash code of the cube corresponding to the one dynamic geofence zone to increase or reduce a size of the one dynamic geofence zone in the spatial dimension and (ii) shifting or changing a length of the at least one time period in the temporal dimension;

receiving, by the one or more servers, a request for a trip from a computer device of the rider;

determining, by the one or more servers, that a pickup location is within the one dynamic geofence zone of the at least one set of dynamic geofence zones and that a time of the trip is within a time period of the one dynamic geofence zone of the at least one set of dynamic geofence zones; and based on the determination, transmitting, by the one or more servers, a request to the computer device of the rider requiring the rider to make a new request from a different location from the pickup location.

2. The method of claim 1, wherein updating the plurality of cubes corresponding to the at least one set of dynamic geofence zones further comprises removing at least one dynamic geofence zone from the at least one set of dynamic geofence zones.

3. The method of claim 1, wherein adjusting the number of characters of the geohash code of the cube corresponding to the dynamic geofence zone comprises reducing a size of the dynamic geofence zone by increasing the number of characters of the geohash code of the cube corresponding to the dynamic geofence zone.

4. The method of claim 1, wherein updating the plurality of cubes corresponding to the at least one set of dynamic geofence zones further comprises changing the at least one time period of the one dynamic geofence zone.

5. The method of claim 1, wherein updating the plurality of cubes corresponding to the at least one set of dynamic geofence zones comprises changing the geohash code of a cube corresponding to at least one dynamic geofence zone of the at least one set of dynamic geofence zones.

6. The method of claim 5, wherein:

the one dynamic geofence zone of the at least one set of dynamic geofence zones is deployed at a residence address associated with a flagged rider; and the geohash code of the one dynamic geofence zone of the at least one set of dynamic geofence zones is changed to a new residence address associated with the flagged rider.

7. The method of claim 1, wherein deploying the at least one set of dynamic geofence zones comprising:

obtaining a number of flagged riders in a new area;

determining whether the number of flagged riders is greater than a threshold; and in response to determining that the number of flagged riders is greater than the threshold, deploying at least one dynamic geofence zone of the at least one set of dynamic geofence zones to the new area.

8. A system, comprising one or more processors and one or more non-transitory computer-readable memories coupled to the one or more processors and configured with instructions executable by the one or more processors to cause the system to perform operations comprising:

creating a static geofence fixed to a geographic location;

in response to collecting rider behavior data and safety incident data over a first threshold, converting, based on the collected data, the static geofence to at least one set of dynamic geofence zones, the at least one set of dynamic geofence zones corresponding to a plurality of spatial-temporal cubes, wherein each cube represents a dynamic geofence zone, a spatial dimension of the cube comprises a geohash code corresponding to an adjustable area within the geographic location, and a temporal dimension of the cube comprises at least one time period, and the at least one set of dynamic geofence zones are based at least on residence addresses of flagged riders;

deploying the at least one set of dynamic geofence zones for responding to a trip request, wherein the responding to the trip request comprises:

determining a remedial action when a pickup location or a destination of the trip request is within the spatial dimension of the cube and a time of the trip request is within the temporal dimension of the cube respectively based on a rider corresponding to the trip request, selecting a number of one or more of the at least one set of dynamic geofence zones and a size of each of the one or more of the at least one set of dynamic geofence zones;

based on the collected rider behavior data and safety incident data, training a machine learning model to predict one or more areas to have a number of safety incidents in the future over a second threshold;

updating the plurality of cubes corresponding to the at least one set of dynamic geofence zones, wherein the updating comprises:

moving, based on the trained machine learning model and residence address change of one or more of the flagged riders, one dynamic geofence zone from an area to a different area predicted to have a number of safety incidents in the future over the second threshold by changing a geohash location in the cube corresponding to the one dynamic geofence zone, and adjusting the cube by (i) adjusting, based on a model recall accuracy of the one dynamic geofence zone, a number of characters of the geohash code of the cube corresponding to the one dynamic geofence zone to increase or reduce a size of the one dynamic geofence zone in the spatial dimension and (ii) shifting or changing a length of the at least one time period in the temporal dimension;

receiving a request for a trip from a computer device of the rider;

determining that a pickup location is within the one dynamic geofence zone of the at least one set of dynamic geofence zones and that a time of the trip is within a time period of the one dynamic geofence zone of the at least one set of dynamic geofence zones; and based on the determination, transmitting a request to the computer device of the rider requiring the rider to make a new request from a different location from the pickup location.

9. The system of claim 8, wherein updating the plurality of cubes corresponding to the at least one set of dynamic geofence zones further comprises removing at least one dynamic geofence zone from the at least one set of dynamic geofence zones.

10. The system of claim 8, wherein adjusting the number of characters of the geohash code of the cube corresponding to the dynamic geofence zone comprises reducing a size of the dynamic geofence zone by increasing the number of characters of the geohash code of the cube corresponding to the dynamic geofence zone.

11. The system of claim 8, wherein updating the plurality of cubes corresponding to the at least one set of dynamic geofence zones further comprises changing the at least one time period the one dynamic geofence zone.

12. The system of claim 8, wherein updating the plurality of cubes corresponding to the at least one set of dynamic geofence zones comprises changing the geohash code of a cube corresponding to at least one dynamic geofence zone of the at least one set of dynamic geofence zones.

13. The system of claim 12, wherein:
the one dynamic geofence zone of the at least one set of dynamic geofence zones is deployed at a residence address associated with a flagged rider; and
the geohash code of the one dynamic geofence zone of the at least one set of dynamic geofence zones is changed to a new residence address associated with the flagged rider.

14. The system of claim 8, wherein deploying the at least one set of dynamic geofence zones comprising:
obtaining a number of flagged riders in a new area;
determining whether the number of flagged riders is greater than a threshold; and
in response to determining that the number of flagged riders is greater than the threshold, deploying at least one dynamic geofence zone of the at least one set of dynamic geofence zones to the new area.

15. A non-transitory computer-readable storage medium configured with instructions executable by one or more processors to cause the one or more processors to perform operations comprising:
creating a static geofence fixed to a geographic location;
in response to collecting rider behavior data and safety incident data over a first threshold, converting, based on the collected data, the static geofence to at least one set of dynamic geofence zones, the at least one set of dynamic geofence zones corresponding to a plurality of spatial-temporal cubes, wherein each cube represents a dynamic geofence zone, a spatial dimension of the cube comprises a geohash code corresponding to an adjustable area within the geographic location, and a temporal dimension of the cube comprises at least one time period, and the at least one set of dynamic geofence zones are based at least on residence addresses of flagged riders;

deploying the at least one set of dynamic geofence zones for responding to a trip request, wherein the responding to the trip request comprises:
determining a remedial action when a pickup location or a destination of the trip request is within the spatial dimension of the cube and a time of the trip request is within the temporal dimension of the cube respectively based on a rider corresponding to the trip request, selecting a number of one or more of the at least one set of dynamic geofence zones and a size of each of the one or more of the at least one set of dynamic geofence zones;

based on the collected rider behavior data and safety incident data, training a machine learning model to predict one or more areas to have a number of safety incidents in the future over a second threshold;

updating the plurality of cubes corresponding to the at least one set of dynamic geofence zones, wherein the updating comprises:
moving, based on the trained machine learning model and residence address change of one or more of the flagged riders, one dynamic geofence zone from an area to a different area predicted to have a number of safety incidents in the future over the second threshold by changing a geohash location in the cube corresponding to the one dynamic geofence zone, and adjusting the cube by (i) adjusting, based on a model recall accuracy of the one dynamic geofence zone, a number of characters of the geohash code of the cube corresponding to the one dynamic geofence zone to increase or reduce a size of the one dynamic geofence zone in the spatial dimension and (ii) shifting or changing a length of the at least one time period in the temporal dimension;

receiving a request for a trip from a computer device of the rider;

determining that a pickup location is within the one dynamic geofence zone of the at least one set of dynamic geofence zones and that a time of the trip is within a time period of the one dynamic geofence zone of the at least one set of dynamic geofence zones; and based on the determination, transmitting a request to the computer device of the rider requiring the rider to make a new request from a different location from the pickup location.

16. The non-transitory computer-readable storage medium of claim 15, wherein updating the plurality of cubes corresponding to the at least one set of dynamic geofence zones further comprises removing at least one dynamic geofence zone from the at least one set of dynamic geofence zones.

17. The non-transitory computer-readable storage medium of claim 15, wherein adjusting the number of characters of the geohash code of the cube corresponding to the dynamic geofence zone comprises reducing a size of the dynamic geofence zone by increasing the number of characters of the geohash code of the cube corresponding to the dynamic geofence zone.

18. The non-transitory computer-readable storage medium of claim 17, wherein:
   the one dynamic geofence zone of the at least one set of dynamic geofence zones is deployed at a residence address associated with a flagged rider; and
   the geohash code of the one dynamic geofence zone of the at least one set of dynamic geofence zones is changed to a new residence address associated with the flagged rider.

* * * * *